W. W. TRUXELL & W. K. WERTZ.
VALVED LUBRICATING DEVICE.
APPLICATION FILED JULY 1, 1914.

1,149,873.

Patented Aug. 10, 1915.

WITNESSES

INVENTORS

UNITED STATES PATENT OFFICE.

WHITELEY W. TRUXELL AND WILLIAM K. WERTZ, OF GREENSBURG, PENNSYLVANIA.

VALVED LUBRICATING DEVICE.

1,149,873.

Specification of Letters Patent. Patented Aug. 10, 1915.

Application filed July 1, 1914. Serial No. 848,420.

*To all whom it may concern:*

Be it known that we, WHITELEY W. TRUXELL and WILLIAM K. WERTZ, citizens of the United States, and residents of Greensburg, in the county of Westmoreland and State of Pennsylvania, have invented certain new and useful Improvements in Valved Lubricating Devices, of which the following is a specification.

The object of this invention is to provide an efficient self-closing inlet valve device for lubricators, and particularly lubricators in which the lubricant is supplied to a chamber and from which it feeds by gravity or otherwise to a journal or bearing.

The invention is embodied in a self-contained device which may be applied to or secured within an opening in the oil chamber, and when in place provides an efficient closure therefor, the valve being adapted to open under the pressure of an oiler spout, and close and substantially seal the inlet opening when the spout is removed.

The invention may be applied to various forms of lubricant holding chambers, the invention not being limited in this regard. For the purpose of illustration it is here shown applied to the oil chamber of a self-lubricating wheel, such as is commonly used for mine cars, where it is very efficient in closing the oil inlet, preventing the escape and waste of oil and excluding coal dust, etc.

Figure 1:
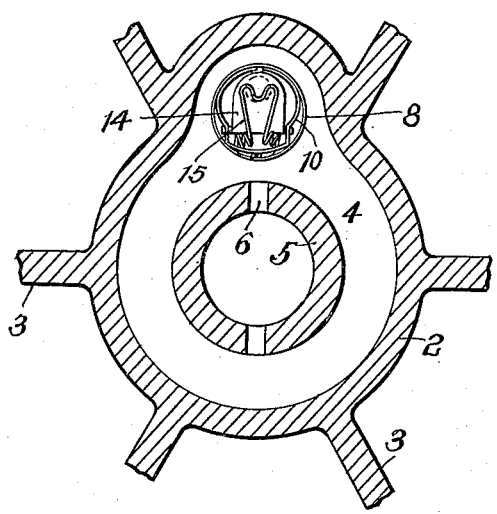
Figure 2:
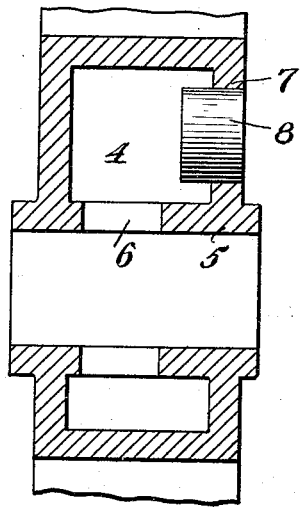
Figure 3:
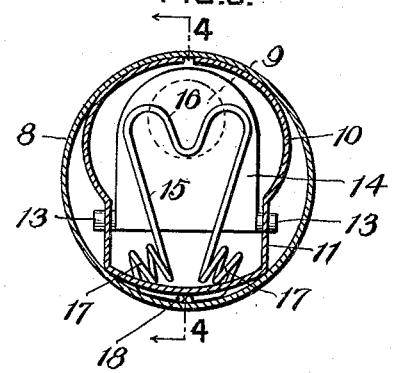
Figure 4:
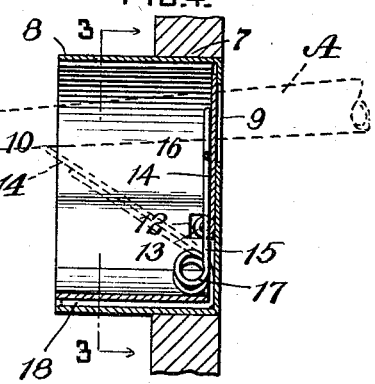
Figure 5:
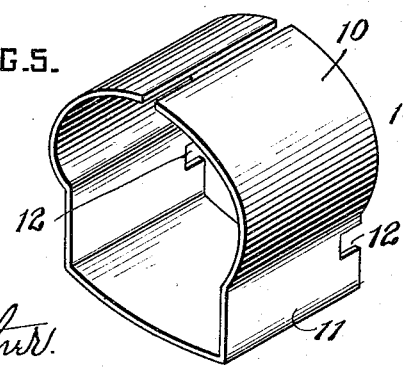
Figure 6:
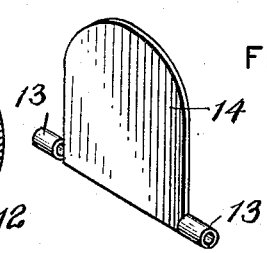

In the self-oiling wheel adaptation illustrated in the accompanying drawings, Figure 1 is a vertical cross-sectional view through the hub and oil chamber of a mine car wheel, showing the improved device applied thereto, and Fig. 2 is a longitudinal section of the same. Figs. 3 and 4 are sectional views of the closure mechanism, Fig. 3 being taken on line 3—3 of Fig. 4, and Fig. 4 on line 4—4 of Fig. 3. Fig. 5 is a view in detail of the bushing liner, and Fig. 6 is a similar view of the closure or valve.

Referring to the drawings, 4 designates the oil-holding chamber of a lubricating device which in the present adaptation is shown embodied in hub 2 of a self-lubricating wheel such as is commonly used on mine cars, 3 being spokes radiating from the hub to a rim or tread, not shown. The oil chamber is ordinarily cored in the hub when casting the wheel.

5 is the wheel eye or box, and 6 are openings therethrough for passing oil from the oil chamber to the journal.

The device of the present invention is applied to a suitable opening in the chamber, in the adaptation shown having a driving fit in side opening 7, although it may be otherwise applied. The device consists of a cup-like casing or bushing 8 which is open at its inner end and at its outer end closed save for filling opening 9. The casing or bushing is preferably, though not necessarily, pressed from a suitable sheet-metal blank. Fitting within bushing 8 is liner 10 which may be bent up from a strip of sheet-metal, the liner being open at its ends, and at opposite sides it is contracted or inset at 11. These opposite contracted portions are notched at one end at 12 to provide bearings for trunnions 13 arranged at opposite sides of the flat closure or valve 14. The latter is so hinged that when closed it bears flatly against the inner face of the end wall of bushing 8 and closes and substantially seals the opening 9.

The closure is held normally shut by the bent-up spring 15 having a portion 16 of loop form, the spring being coiled between its ends at 17 with the extremities 18 of the coils confined between the bushing and the liner. The contracted side portions 11 of the liner provide ample room and clearance for the hinge-forming trunnions, and the hinged edge of the closure is spaced from coil 17 sufficiently to prevent interference when the closure is pressed open by the spout A of an oiling device, as shown in dotted lines in Fig. 4. In the arrangement shown the spring coils overhang the inner face of the liner, and with the hinged edge of the closure spaced from the coils as shown the closure may open to or even beyond the horizontal position without interference from the coils.

The improved device provides a simple, inexpensive and durable closure for any oil chamber which is to be maintained normally closed for excluding dust and for preventing waste. It is particularly well adapted for the rough usage to which mine car wheels are subjected, when applied as shown the casing or bushing 8 being driven in flush with the wall of the oil chamber so that there are no exposed or projecting parts. For mine-car-wheel use it is only necessary to cast the chamber with opening 7, and the closure means is complete when the improved self-contained device is entered in such opening.

We claim:—

1. The combination of an oil chamber having an opening in a wall thereof, a casing applied to the opening and open at its inner end to the chamber and closed at its outer end save for a filling opening, a hinged inwardly-opening spring-closed closure for the filling opening, and supporting means on which the closure is hinged, said means entered through the open inner end of the casing and removably confined in the latter.

2. The combination of an oil chamber having an opening in a wall thereof, a casing applied to the opening and open at its inner end to the chamber and closed at its outer end save for a filling opening, an inwardly-opening spring-closed closure for the filling opening, and a closure support within the casing and adapted to be entered through the open end of the latter and removably confined therein, the support provided with hinge bearings for the closure.

3. The combination of an oil chamber having an opening in a wall thereof, a casing applied to the opening and open at its inner end and closed at its outer end save for a filling opening, a liner for the casing, an inwardly opening closure for the filling opening hinged to the liner, and a spring for opposing opening movement of the closure.

4. The combination of an oil chamber having an opening in a wall thereof, a casing applied to the opening with the casing open at its inner end and closed at its outer end save for a filling opening, an open-end liner fitting within the casing and at opposite sides formed with bearings, an inwardly opening closure for the filling opening provided with opposite trunnions which are mounted in the bearings, and a spring for opposing opening movement of the closure.

5. The combination of an oil chamber provided with an opening in a wall thereof, a casing applied to the opening, the casing open at its inner end and closed at its outer end save for a filling opening, a liner fitting within the casing, an inwardly opening closure for the filling opening, and a spring confined between the liner and the casing with a portion of the spring in engagement with the closure and opposing opening movement thereof.

6. The combination of an oil chamber having an opening in a wall thereof, a casing fitting the opening with the casing open at its inner end and closed at its outer end save for a filling opening, a liner for the casing having opposite sides formed with bearings, an inwardly opening closure for the filling opening having oppositely projecting trunnions mounted in the bearings, and a spring coiled between its ends with the portion of the spring at one side of the coil confined between the casing and the liner and the portion of the spring at the opposite side of the coil engaging the valve and opposing opening movement thereof.

7. The combination of an oil chamber having an opening in a wall thereof, a casing fitting the opening with the casing open at one end and at its opposite end closed save for a filling opening, an open-end liner fitting within the bushing with opposite sides of the liner spaced inwardly from the casing and formed with bearing openings, an inwardly opening closure provided with trunnions which are mounted in the liner openings, and a spring for opposing inward movement of the closure.

In testimony whereof we affix our signatures in presence of two witnesses.

WHITELEY W. TRUXELL.
WILLIAM K. WERTZ.

Witnesses:
S. W. BIERER,
ALFRED W. HANSON.